(12) United States Patent
Clauberg (10) Patent No.: US 6,389,018 B1
(45) Date of Patent: May 14, 2002

(54) PARALLEL ON-THE-FLY PROCESSING OF FIXED LENGTH CELLS

(75) Inventor: Rolf Clauberg, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/101,787

(22) PCT Filed: Feb. 16, 1996

(86) PCT No.: PCT/IB96/00087

§ 371 Date: Jul. 16, 1998

§ 102(e) Date: Jul. 16, 1998

(87) PCT Pub. No.: WO97/29613

PCT Pub. Date: Aug. 14, 1997

(51) Int. Cl.[7] .................................................. H04J 3/24
(52) U.S. Cl. ...................................................... 370/394
(58) Field of Search ................................. 370/535, 537, 370/351, 352, 395, 389, 465, 474, 356, 353, 475, 399, 401, 442, 394, 397, 398, 400, 471, 476, 459, 428, 412; 714/746, 752, 761, 762

(56) References Cited

U.S. PATENT DOCUMENTS 5,940,456 A * 8/1999 Chen et al. .................. 370/537
6,021,135 A * 2/2000 Ishihasa et al. ............. 370/356

FOREIGN PATENT DOCUMENTS

EP          0606729        *  7/1994

OTHER PUBLICATIONS

Toshiya Aranaki et al. "Parallel" Atom "Skitch Architecture For High Speed ATM Networks" pp. 251–254, Jun. 1992.*
Publication, 4–180321(A), Asynchronous Digital Signal Multiplexing Processing Circuit.
Publication, 6–244857(A), Device for Carrying ATM Cell.
Publication, 5–244857(A), ATM Communication Equipment and Cell Band Control.
Publication, 2–82741(A), Self–Routing Concentrating System for ATM and Its Buffer Scanning System.
Publication, 5–235980(A), ATM Traffic Monitor Control System.

* cited by examiner

*Primary Examiner*—Dang Ton
(74) *Attorney, Agent, or Firm*—Scott W. Reid

(57) ABSTRACT

An apparatus is provided for processing a sequential stream of fixed length cells received via a slotted data transmission medium. The cells may be asynchronous transfer mode (ATM) cells. The apparatus utilizes a demultiplexer to create N (N=2,3,4 . . . ) sub-streams of cells from the input stream and to pass each sub-stream to one of N processing paths. Each of the processing paths is identical and they operate in parallel. The cell sub-streams are fed into the processing paths in a chronological, staggered manner where the time between one sub-stream being fed into its processing path and the next sub-stream being fed into another processing path is equal to the slot duration of the transmission medium. Finally, the apparatus utilizes a multiplexer to combine the processed sub-streams into an output stream which maintains both the sequential order of the cells and their arrangement in the slots of the slotted transmission medium.

16 Claims, 8 Drawing Sheets

PARALLEL ON-THE-FLY PROCESSING OF FIXED LENGTH CELLS

TECHNICAL FIELD

The present invention relates to systems, such as an asynchronous transfer mode (ATM) network for example, where information is transmitted by means of fixed length cell streams via a slotted transmission medium. It allows on-the-fly processing of cells up to very high data transmission rates.

BACKGROUND OF THE INVENTION

Cell-processing systems, like communication networks and storage systems, are getting more and more important. An advantage of these kind of cell-based systems is that each and any cell is autonomous and can be routed through a network, for example, just by making use of the information carried in the cell's header. Asynchronous transfer mode (ATM) data transmission networks are the most well known cell processing systems. The ATM data transmission technology has the potential to revolutionize the way networks are built. This technology enables high-speed data transmission rates and supports many types of traffic including, data, facsimile, voice, real-time video, and images, just to name the most important types encountered in a typical multimedia environment. ATM is suited for local area networks (LAN) as well as wide area networks (WAN) and takes:advantage of the high throughput rates possible on optical fibers.

Typical devices for cell processing systems of any kind are: routers, hubs, switches, e.g. used for interconnection purposes, and adapter cards for linking computers or other devices such as printers, plotters, scanners, disk drives, fax machines, network sniffers, to a cell processing system. The faster the cells are transmitted in such a cell processing system, the more complex and expensive the cell handling and processing gets. The problems encountered if one increases the data transmission rate are elucidated in the following by means of an example.

The higher the data transmission rate in a cell based system (e.g. an ATM system) is, the faster certain operations must be performed on the cells. On-the-fly cell processing which usually requires that all operations are completed within a given number of clock cycles (corresponding to the time until the next cell on the slotted medium arrives) is getting difficult, if not even impossible. The slot duration on the medium defines the maximum duration a process step may take. With increasing data transmission rates, the time until arrival of the next cell gets shorter and shorter. To meet this time, either the number of clock cycles for a given operation must be cut, or the duration of the time cycles must be shortened, i.e. devices must be provided which can be operated at higher clock rates. The first approach is often limited by the kind of operation to be performed, e.g. a binary search of 16000 addresses requires $\log_2(16000)=14$ comparisons and hence 14 clock cycles. The second possibility is limited by the chosen technology base which determines the time a logic circuit needs to perform its function. For each known technology base there is an upper processing speed limit defined by the underlying physical effects made use of.

Some cell processing systems have reached data transmission rates where the bounds of possibility are reached already, or will be reached soon. There is a demand for new approaches to circumnavigate or solve this problem. In particular ATM networks operating in the Gigabit per second range have reached a stage where new solutions are needed.

It is thus an object of the present invention to provide a new concept for fixed length cell processing even at very high data transmission rates.

It is a further object of the present invention to provide an apparatus and method enabling very fast on-the-fly processing of fixed length cells.

It is another object of the present invention to apply the inventive approach to asynchronous transfer mode systems.

SUMMARY OF THE INVENTION

The invention as claimed is intended to meet these objectives. According to the present invention, the consecutive fixed length cells on a slotted medium are assigned to N parallel, identical processing paths each of which comprise one or more processing units. Due to this, the number of clock cycles available to such a Processing unit is multiplied by N if only each (N+1)-th cell is processed by the same processing path. This introduces N virtual but identical data processing paths.

DESCRIPTION OF THE DRAWINGS

The invention is described in detail below with reference to the following drawings.

GENERAL DESCRIPTION

In the following, the ATM data transmission technology will be used to explain the present invention in detail. It is, however, to be understood that the inventive concept can be used for any other kind of cell-based data transmission system as will be indicated later.

In the following, the expression 'sub-stream of fixed length cells' will be used. This expression not only covers streams comprising several cells, but also a single cell. Such a single cell may be an ATM cell.

As mentioned in the introduction, there is a need for a new concept which facilitates on-the-fly processing of fixed length cell streams received via a slotted medium. Such a slotted medium may be a data transmission channel of a data transmission network, a storage channel within a storage device, or a computer bus, for example.

It has to be taken into account that there may be time-critical information on such a slotted medium which has to be handled in an appropriate manner. Furthermore, the allocation of slots on this slotted medium 11 has to remain unaffected since bandwidth is allocated to a particular application by assigning slots on the slotted medium. Any intervention leading to the mixing up of cells or obstruction of time-critical cells has to be avoided.

Figure 1:
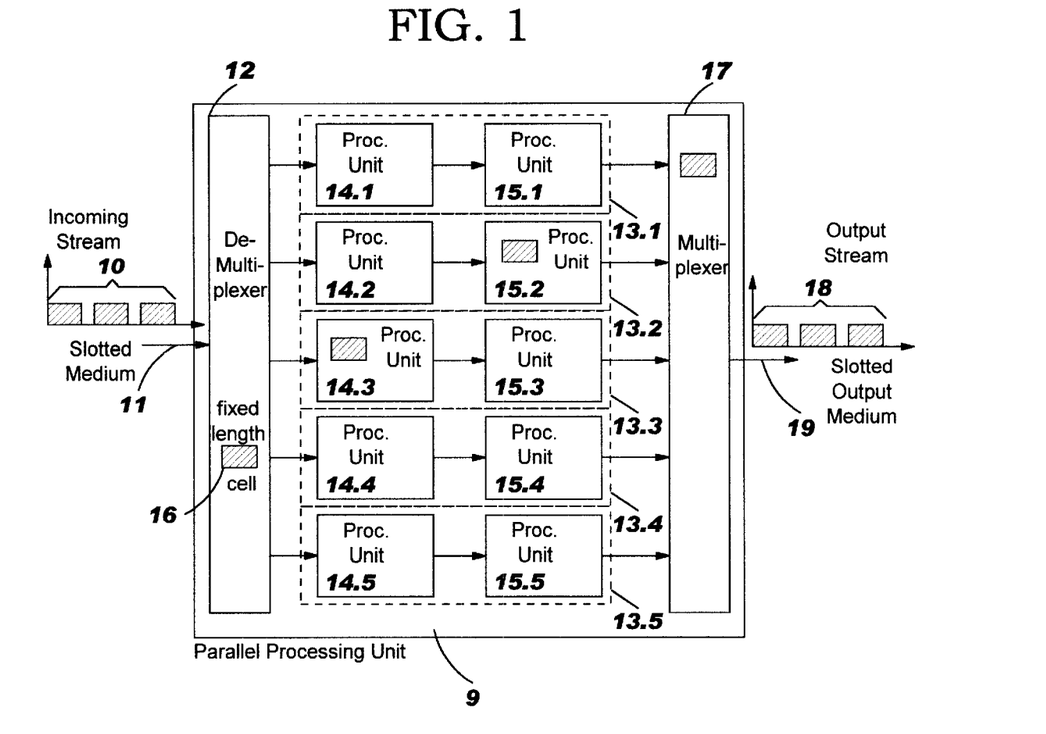
FIG. 1 is a schematic illustration of a first embodiment of the present invention, this embodiment comprising a parallel processing unit with N=5 parallel processing paths.

Since the conventional, sequential cell-by-cell processing has turned out not to be suited in high speed data transmission systems, a new approach is required. The basic concept of the present invention is now described with reference to FIG. 1. There is an incoming stream 10 of fixed length cells on a slotted medium 11, shown on the left hand side of FIG. 1. According to the invention, the incoming stream 10 of fixed length cells is fed into a parallel processing unit 9 where it is demultiplexed into N sub-streams of fixed length cells (with N=1,2, 3, . . . ). The demultiplexing is done without corrupting the cells' content and without modifying the length of the cells. The number N depends on the data transmission rate, the number of cycles the subsequent processing will take, the length of the cells and other parameters. The- demultiplexer 12 splits the cell stream 10 into five sub-streams (i.e N=5). These five sub-streams are then provided at the N output ports of the demultiplexer 12 and fed into N identical, parallel processing paths 13.1–13.5. In the present example each processing path comprises two processing units 14.x and 15.x. The processing of cells 16 through the parallel processing paths 13.–13.5 will be elaborated in connection with FIG. 2 and FIGS. 3A–3G. At the right hand side of the parallel processing paths 13.1–13.5, the sub-streams—after having been processed—are fed into a multiplexer 17 employed to provide an output stream 18 of fixed length cells on the slotted output medium 19. This multiplexer 17 is designed such that the original sequence of the cells, i.e. the chronological order on the input medium 11, is re-established. This means that not only the order of cells (like in a FIFO device; first in first out) but also the exact arrangement within the slots is maintained.

Figure 2:
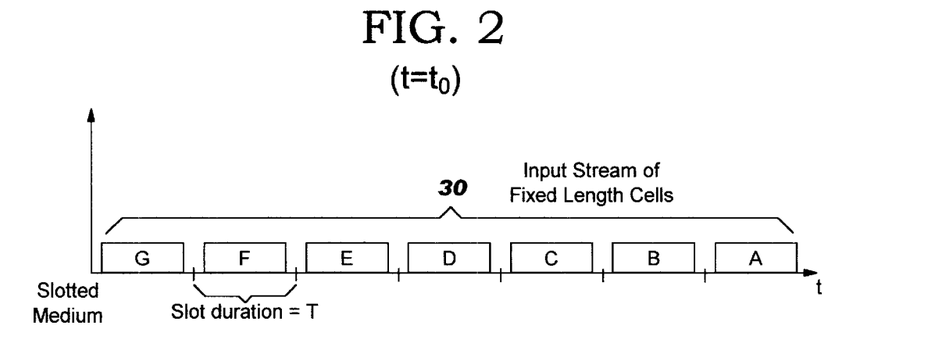
FIG. 2 shows a stream of fixed length cells on a slotted medium.
Figure 3A:
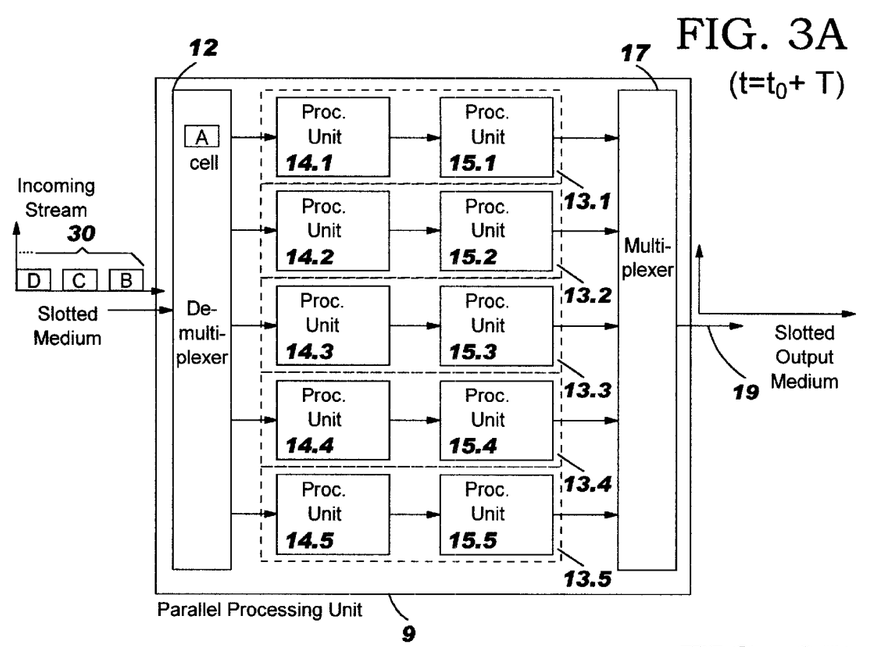
FIGS. 3A–3G are schematic snapshots of a parallel processing unit with N=5 parallel processing paths used to illustrate the routing and processing of cells.
Figure 3B:
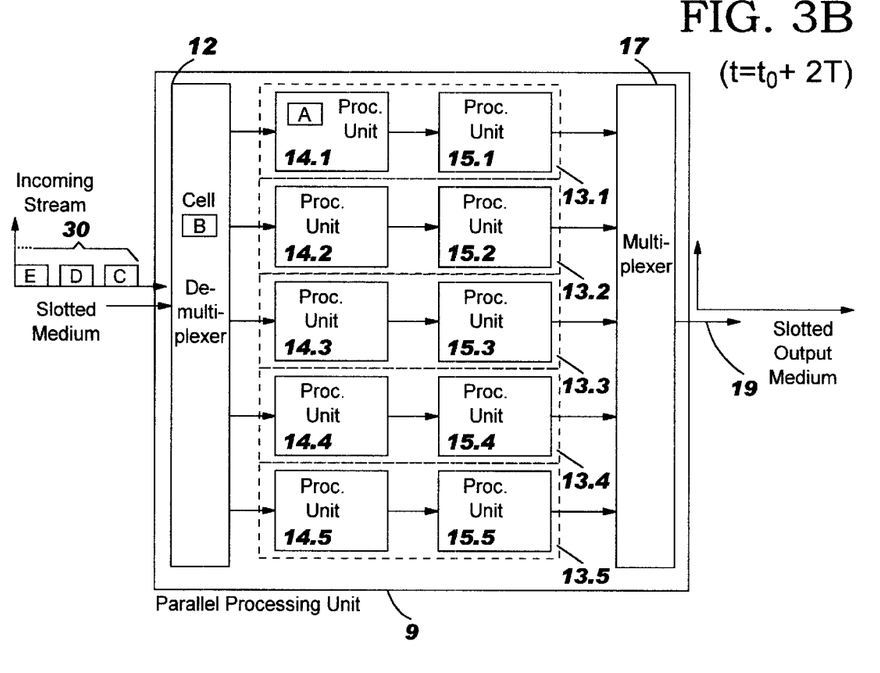
Figure 3C:
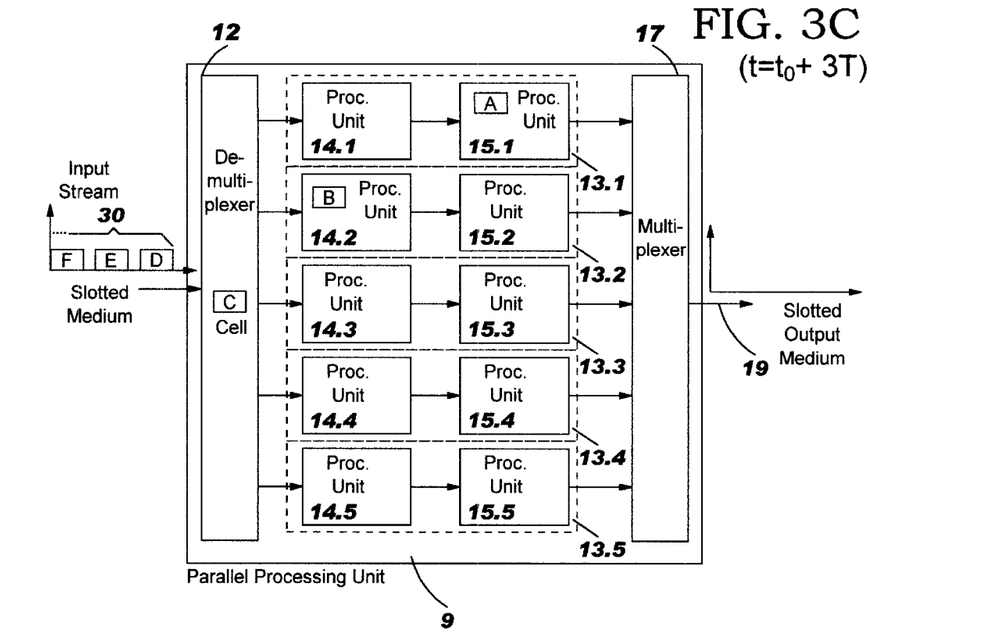
Figure 3D:
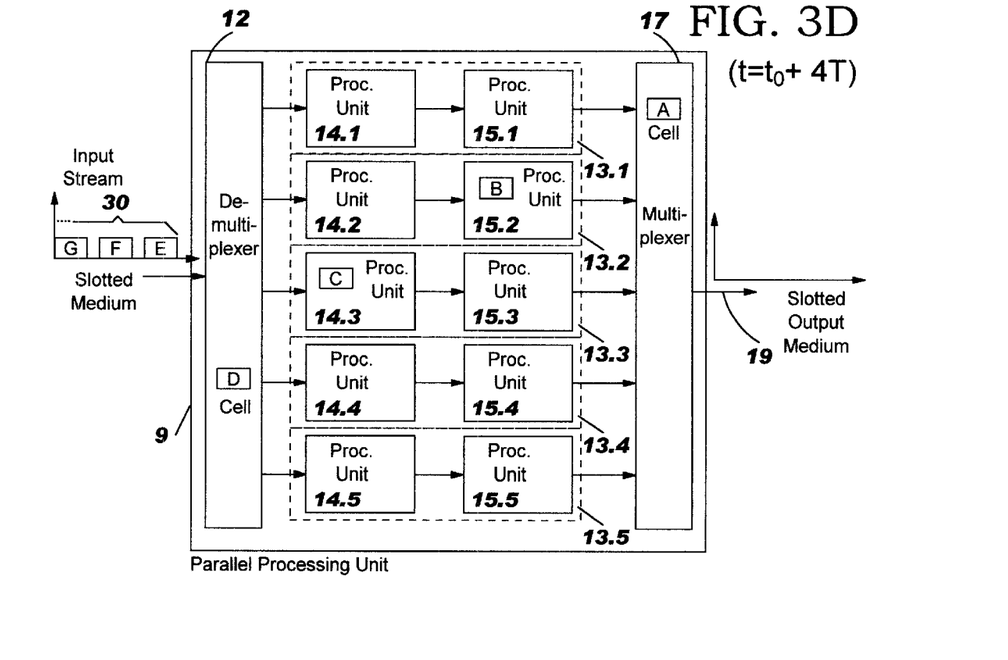
Figure 3E:
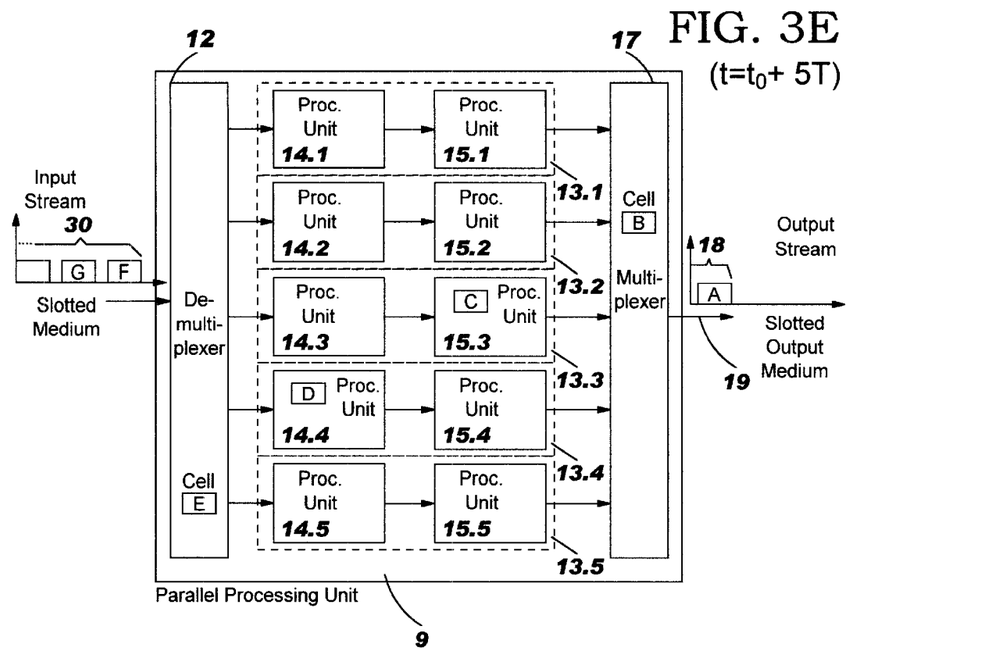
Figure 3F:
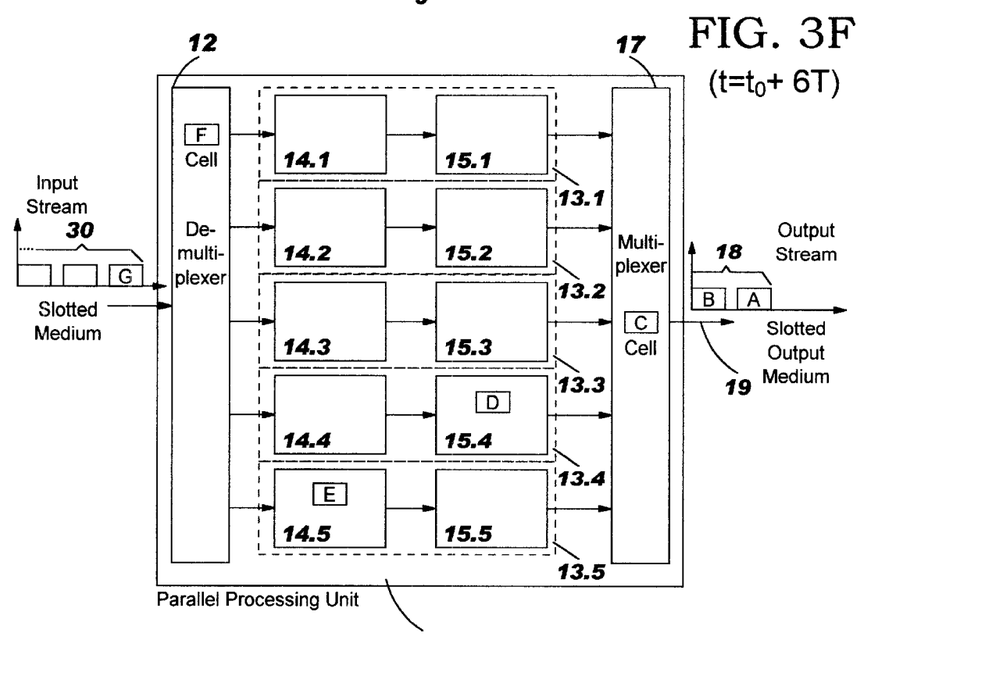
Figure 3G:
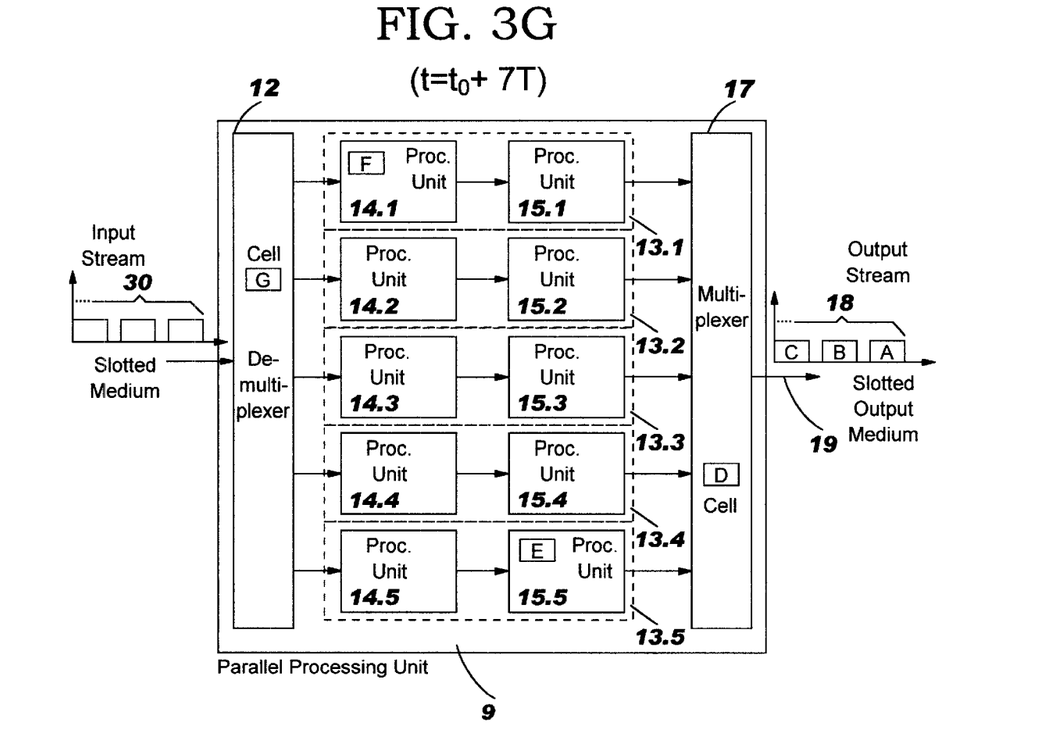

In FIG. 2, a typical stream 30 of fixed length cells A–G is illustrated. The slotted character of the transmission medium is indicated by dividing up the time axis into slots. The slot duration is denoted by the letter 'T'. The snapshot shown in FIG. 2 is taken at the time $t=t_0$. The stream 30 of fixed length cells A–G will now be fed through the inventive parallel processing unit 9 illustrated in FIG. 1. Snapshots are taken at the times $t=t_0+T$, $t=t_0+2T$, $t=t_0+3T$, $t=t_0+4T$, $t=t_0+5T$, $t=t_0+6T$, and $t=t_0+7T$. This sequence of snapshots are illustrated in FIGS. 3A–3G. As can be seen from this sequence, the first sub-stream of cells (note that in the present example a sub-stream of cells consists of one cell only) is fed into the first processing path 13.1, the second sub-stream is fed into the second path 13.2 one slot duration later, and so forth. As illustrated in FIG. 3C and D, the first sub-stream (cell A) is the first one reaching the multiplexer 17. The second sub-stream (cell B) is one step behind. The multiplexer 17 now outputs the first sub-stream (cell A) onto the slotted medium 19, while all other sub-streams are still processed. Sub-stream by sub-stream the streams arriving at the multiplexer 17 are multiplexed onto the outgoing medium 19, and a stream 18 of fixed length cells is re-established as can be seen-on the right hand side of FIG. 3G. The chronological order on the output side is exactly the same as it originally was on the input side.

Figure 4A:
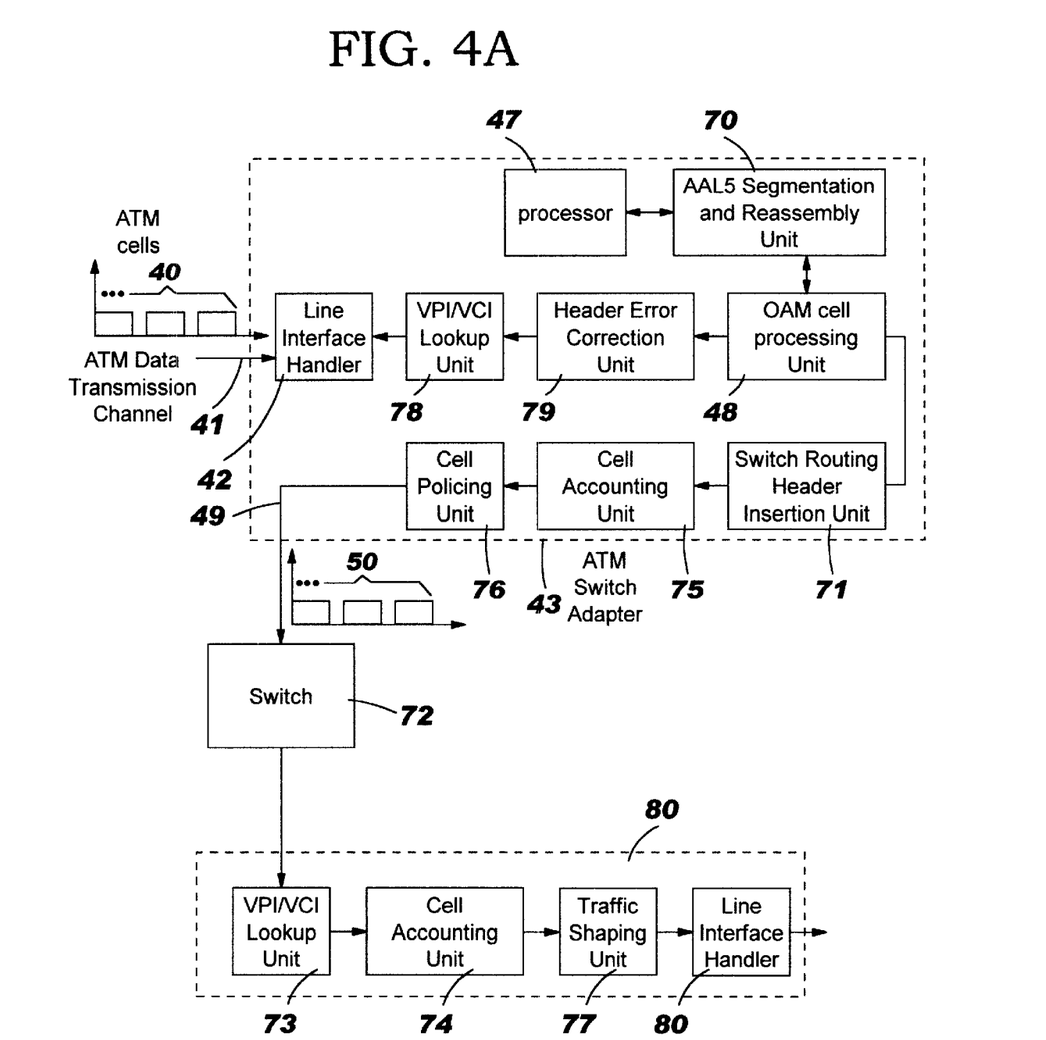
FIG. 4A is a schematic illustration of an asynchronous transfer mode switching unit having a switch adapter card according to the present invention.

As illustrated in FIG. 4A, the arrangement of cell processing units in the data path from the physical layer to an ATM switch 72 and further on the physical medium on the other side of the switch 72 is highly sequential and normally contains only the one branching point where the cells are forwarded either to the switch 72 or to a microprocessor 47 which handles certain management operation cells (OAM: Operation and maintenance cells). It is therefore ideally suited for on the-fly cell processing. A standard arrangement is shown in FIG. 4A. The first unit is the line interface handler 42 which arbitrates the receiving of ATM cells 40 from several first-in-first-out units (FIFOs). The next unit is a VPI/VCI lookup unit 78 (VPI: virtual path identifier; VCI: virtual channel identifier) which compares the VPI/VCI fields of an ATM cell with a predefined lookup table and adds several bits in front of the cell which tell further units what to do with this particular cell. A further unit is the header error correction unit 79 which analysis the ATM cell header for bit-errors and corrects certain errors or marks cells with uncorrectable errors for removal. The OAM cell processing unit 48 extracts OAM cells for the microprocessor 47 or inserts such cells into the cell stream. The AAL5 (AAL: ATM adaptation layer) segmentation and reassembly unit 70 reassembles ATM cells into larger packages for the microprocessor 47 or vice versa. The switch routing header insertion unit 71 adds to the ATM cell a switch specific header which tells the switch 72 to which output port (or ports) to forward the cell. The VPI/VCI insertion unit 73 removes the switch routing header and replaces the old VPI/VCI value with the corresponding value for the next link. The cell accounting units 74 and 75 count the number of cells forwarded for a connection, the number of invalid cells and so forth. The cell policing unit 76 at a User Network Interface (UNI) controls that the cell peak rate and medium rate conform to the permissions granted for a connection and remove violating cells. The traffic shaping unit 77 delays cells inside the network until they conform with the permissions again, i.e. it corrects violations of traffic permissions which are caused by the network and not the user. As on the input side, there is a line interface handler 80 on the output side. All these units need a certain number of clock cycles for operation and some of them may need several parallel units to perform in time. Also certain units can be sub-divided further partly again with sequential arrangement of these sub-units and it may be that only certain sub-units need parallisation, according to the present invention.

Figure 4B:
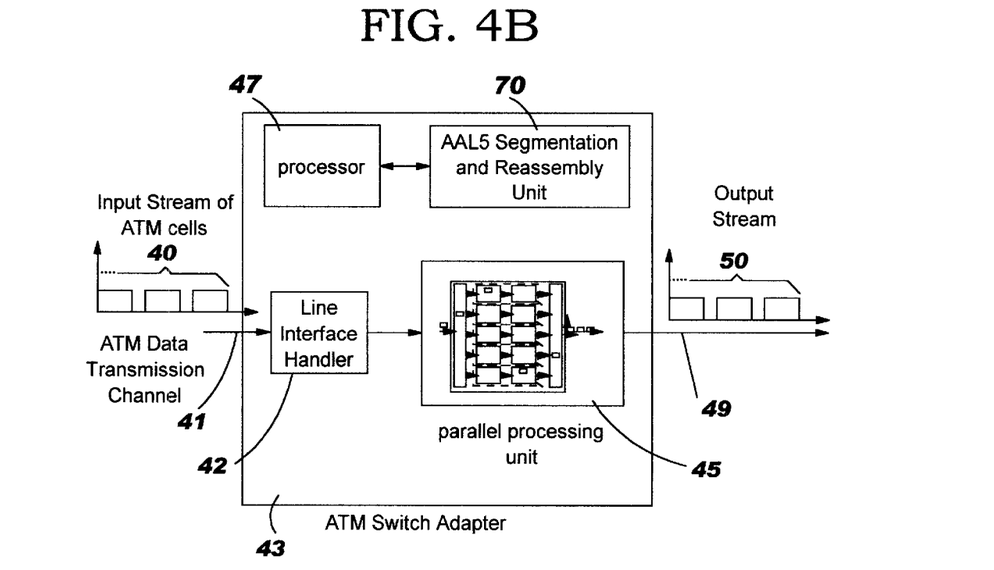
FIG. 4B is a schematic illustration of a second embodiment of the present invention, this embodiment being an ATM switch adapter card for transforming ATM cells into cells which can be processed by an ATM switch fabric.

A schematic embodiment of the present invention, designed to be employed as part of an ATM switch adapter 43 for coupling an ATM data transmission channel 41 to a vendor specific ATM switching fabric 72, is illustrated in FIG. 4B. As described above, such an ATM switch adapter 43 is employed to transform a stream 40 of ATM cells into a stream 50 of cells being suited for routing through a switch fabric 72 requiring specially prepared cells. The structure and content of these specially prepared cells depends on the kind of switch used and varies from vendor to vendor. As schematically indicated in FIG. 4B, such an ATM switch adapter card 43 comprises the units shown in FIG. 4A, some of them being part of a parallel processing unit 45. In the ATM switch adapter 43, those units not being fast enough are carried out in parallel (see box 45). Some of the other units, however, are just needed once. In particular those processing units which need more than one slot duration for processing of a cell are provided several times (N times) to allow parallel processing and arranged between a demultiplexer and multiplexer. The fact that there are some process steps carried out in a parallel, staggered fashion is indicated in FIG. 4B by the inventive parallel processing unit 45 comprising the functional elements of FIG. 1, for sake of simplicity. After having been processed by the ATM switch adapter 43, the stream 50 of cells is then routed through the switch fabric 72 at the output side of which another ATM switch adapter card 81 may be situated. This ATM switch adapter card 81 may be employed to transform the stream of cells back into an ATM stream of cells.

Figure 5:
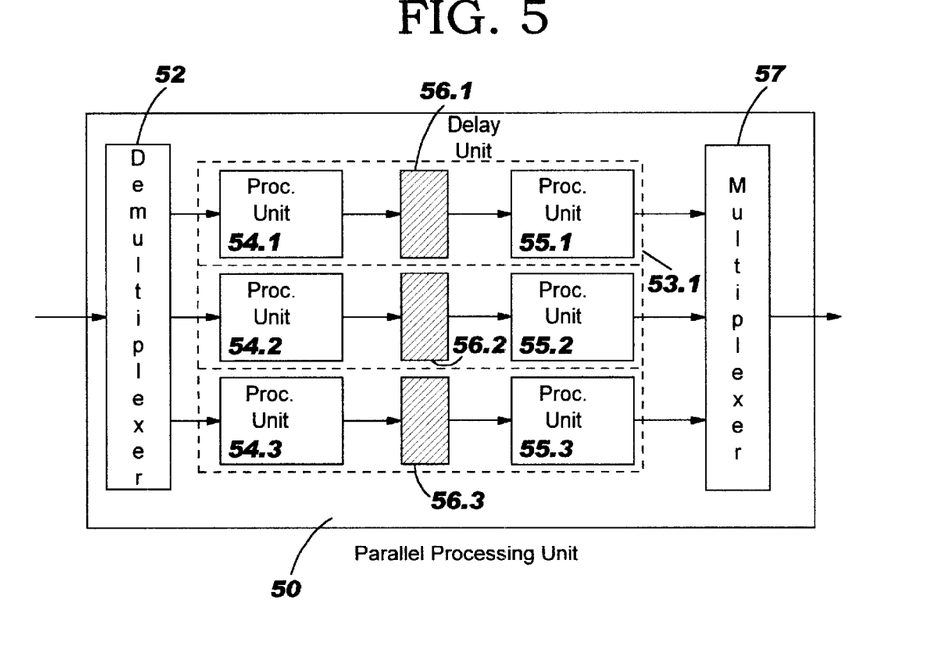
FIG. 5 is a schematic illustration of a third embodiment of the present invention, this embodiment comprising a parallel processing unit with N=3 parallel processing paths, each processing path having a delay unit.

A complication arises in the case where the operation of a data processing unit 55.1 depends on the completion of the operation of the previous unit 54.1 of the same data path 53.1. In this case, it is to be ensured that a cell is not reaching this particular data processing unit 55.1 before the processing in the previous unit 54.1 is completed. According to another embodiment of the present invention, this problem can be dealt with by introducing a delay unit 56.1 in each parallel processing path 53.x such that it is guaranteed that a cell reaches the next processing unit 55.1 not before the processing in the previous unit 54.1 is completed. This principle is schematically by an embodiment of the parallel processing unit 50 having three parallel processing paths 53.x. It is obvious that such a delay unit 56.1 has to be introduced in all of the N=3 parallel processing paths. This ensures that the functionality of the whole parallel processing unit 50 is unchanged. Only the total processing delay of the processing unit 50 is increased by the sum of all delay units per processing path. The delay unit 56.x can also be considered as an integral part of unit 54.1 thereby ensuring that unit 54.1 delivers the cell to the next unit only after completion of all actions.

Figure 7:
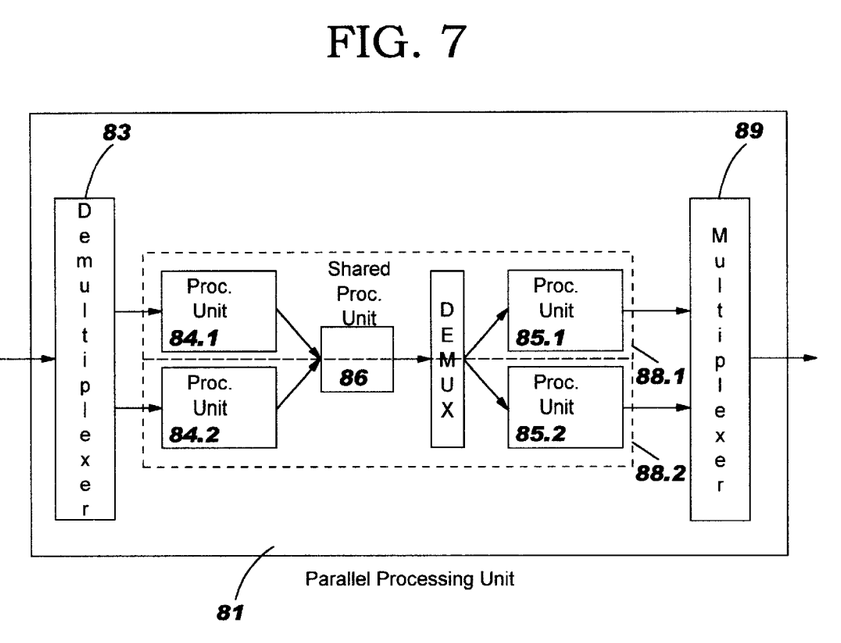
FIG. 7 is a schematic illustration of a fifth embodiment of the present invention, this embodiment comprising a parallel processing unit with N=2 parallel processing paths, one processing unit being used by both processing paths each processing path having a delay unit.

The multiplexers in FIG. 3 as well as those in FIG. 7 can be realized very easily. In principle, it is only needed that the output of the last unit before is latched, i.e. the output is stored in registers which forward their content with the edge of a clock signal. The timing behavior of the slotted system then automatically guarantees that the different data paths fit directly together.

The demultiplexers are more complicated. There are two main possible realizations. Firstly, for N parallel paths they may be connected to a counter whose value starts with 1, increases by 1 for each cell and wraps around to 1 for each (N+1)th cell. The cells are then forwarded to the different data paths according to the counter value. Such a demultiplexer is needed at least at the start position in FIG. 3, but also after each commonly used unit in FIG. 7. Secondly, the very first unit from the line interface may prepend the incoming cells with a bit pattern which counts from 1 to N and then wraps around to 1 again where N is the maximum number of parallel data paths used in the whole parallel processing unit. Each following multiplexer forwards the cells according to this counting bit pattern. This method may be preferred if the number of necessary multiplexers is large and the corresponding number of related counters would use up to much area of the chip.

Figure 6:
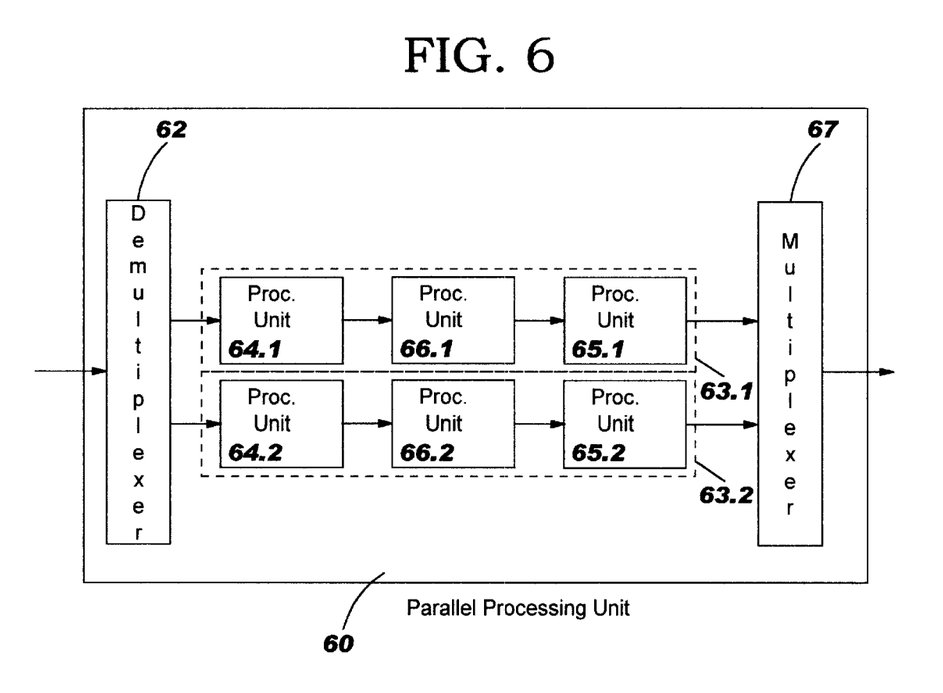
FIG. 6 is a schematic illustration of a fourth embodiment of the present invention, this embodiment comprising a parallel processing unit with N=2 parallel processing paths.

A third embodiment is illustrated in FIG. 6. In this embodiment, the parallel processing unit 60 comprises two parallel processing paths 63.1 and 63.2. Instead of introducing delay units to ensure that the processing of a cell in a specific processing unit does not start before the processing in a previous unit has been completed, other processing units may be introduced between the two units which depend on each other. In FIG. 6, the processing unit 65.1 only operates properly if the processing in units 64.1 has been completed. The same applies to units 65.2 and 64.2. To ensure this, other processing units 66.1 and 66.2 have been introduced inbetween. Due to this, there is no additional delay as is in the case where delay units are employed (see FIG. 5). Just the order of the processing steps is altered. This approach, however, can only be used if it is not critical when the processing in units 66.1 and 66.2 is actually carried out.

Another embodiment of the present invention is shown in FIG. 7. The multiplication of chip area due to the arrangement of multiple parallel processing paths in a parallel processing unit may be significantly reduced if certain processing units are shared by all, or some parallel processing paths. Non-cycle critical units are best suited for this purpose. As shown in FIG. 7, there is a parallel processing unit 81 given which comprises a demultiplexer 83 followed by two parallel processing paths 88.1 and 88.2. On the output side of these parallel processing paths there is a multiplexer 89. In this embodiment, the non-cycle critical processing unit 86 is shared by the two parallel processing paths, i.e., the cells at the output side of processing units 84.1 and 84.2 are all fed and processed through one and the same processing unit 86. This is possible since cells from the different processing paths arrive in a staggered manner, i.e. not at the same time. The common processing unit 86 has to be a unit which completes the processing of a cell within the clock cycle number which corresponds to a slot duration T. AT the output side of the common processing unit 86 there is a demultiplexer 87 for feeding the signals to the right processing units 85.1 and 85.2. The identification of processing units which can be used by several parallel processing paths may be done by the chip designer, or with todays design tools can be done automatically in the synthesis optimization steps either in high-level synthesis, or in gate-level synthesis.

Part of the bandwidth of a cell processing system may be dedicated to a certain application. This is a very important feature of a cell based system and is used in ATM networks for transmission of time critical (real-time) information. However, if such time critical services are supported on a network, all adapters, switches and so on have to support this kind of service. i.e., it is to be ensured that the slots allocated to an application remains unchanged. This is ensured by the parallel processing units according to the present invention.

The present architecture based on the concept of using N parallel processing paths to replace a single cycle-critical processing unit can be employed in all kinds of cell based systems and is thus not limited to ATM data transmission systems. Other examples where the present invention may be used are storage devices where data are transmitted in form of fixed length cells, or computer bus systems.

What is claimed is:

1. Apparatus (9, 45, 50, 60, 70) for processing a sequential stream (10, 30) of fixed length cells, received via a slotted transmission medium (11, 41), comprising:
   a) a demultiplexer (12, 52, 62, 72) providing N substreams of fixed length cells out of said sequential stream (10, 30) of fixed length cells, where N is an integer equal to at least 2,
   b) N identical, parallel processing paths (13.x, 53.x, 63.x, 73.x) connected to said demultiplexer (12, 52, 62, 72) such that
      each of said N sub-streams is fed into another one of said N processing paths (13.x, 53.x, 63.x,88.x),
      the feeding into said processing paths (13.x, 53.x, 63.x, 88.x) taking place in a chronological, staggered manner, the period between a sub-stream being fed into a particular processing path and a next sub-stream being fed into another processing path being identical to the slot duration (T) of said slotted transmission medium (11, 41), c) a multiplexer (17, 57, 67, 77) for multiplexing sub-streams provided at the output of said N processing paths (13.x, 53.x, 63.x, 88.x) into an output stream (18, 50) of fixed length cells maintaining the sequential cell order of said sequential stream (10, 30) of fixed length cells, said multiplexer comprising a register for storing a sub-stream until released by a clock signal to ensure that the exact arrangement of the cells within the slots and the allocation of slots on said slotted transmission medium (11, 41) is maintained.

2. The apparatus of claim 1, wherein each of said sub-streams of fixed length cells comprises just one fixed length cell.

3. The apparatus of claim 2, wherein said fixed length cell is an asynchronous transfer mode (ATM) cell.

4. The apparatus of claim 1, wherein said parallel processing paths (88.1, 88.2) share at least one common processing unit (86).

5. The apparatus of claim 1, wherein each of said parallel processing paths (53.x) comprises at least one delay unit (56.x) in order to ensure that the processing of a sub-stream of cells at a processing unit (55.x) following after said delay unit (56.x) does not start before the processing of the same sub-stream of cells is completed by a processing unit (54.x) before said delay unit (56.x).

6. The apparatus of claim 1, wherein said sequential stream (10, 30) of fixed length cells is a sequential stream of synchronous transfer mode (ATM) cells.

7. Asynchronous transfer mode switch adapter (43) for the processing of asynchronous transfer mode cells received as sequential stream of fixed length cells (40), via a slotted transmission medium (41), said switch adapter (43) comprising:
   a) means (42) for receiving said asynchronous transfer mode cells (40),
   b) a demultiplexer providing N sub-streams of fixed length cells, where N is an integer equal to at least 2,
   c) N identical, parallel processing paths connected to said demultiplexer such that
      each of said N sub-streams is fed into another one of said processing paths,
      the feeding into said processing paths taking place in a chronological, staggered manner, the period between a sub-stream being fed into a particular processing path and a next sub-stream being fed into another processing path being identical to the slot duration (T) of said slotted cell processing medium (41),
   d) a multiplexer for multiplexing sub-streams provided at the output of said N processing paths into an output stream (50) of fixed length cells maintaining the sequential cell order of said sequential stream of fixed length cells, said multiplexer comprising a register for storing a sub-stream until released by a clock signal to ensure that the exact arrangement of the cells within the slots and the allocation of slots on said slotted transmission medium (11, 41) is maintained.

8. The adapter of claim 7, wherein said output stream (50) of fixed length cells is suited for routing through a switching fabric (72).

9. The adapter of claim 7, comprising a virtual path identifier/virtual channel identifier lookup unit (78) employed to compare the virtual path identifier/virtual channel identifier fields of an asynchronous transfer mode cell with a predefined lookup table and to add several bits in front of the asynchronous transfer mode cell in order to inform further units what to do with this particular cell.

10. The adapter of claim 7, comprising a header error correction unit (79) analysing the cell headers of said asynchronous transfer mode cells for bit-errors and correcting certain errors or marking asynchronous transfer mode cells with uncorrectable errors for removal.

11. The adapter of claim 7, comprising an operation and maintenance cell processing unit (48) and a processor (47), said operation and maintenance cell processing unit (48) extracting special operation and maintenance cells for said processor (47) or inserting such operation and maintenance cells into the stream of asynchronous transfer mode cells.

12. The adapter of claim 7, comprising a switch routing header insertion unit (71) adding to each asynchronous transfer mode cell a switch specific header which tells the switch (72) to which output port to forward said asynchronous transfer mode cell.

13. The adapter of claim 7, comprising a cell accounting unit (75) counting the number of asynchronous transfer mode cells forwarded for a connection, and the number of invalid asynchronous transfer mode cells.

14. The adapter of claim 7, comprising a cell policing unit (76) controlling a cell peak rate and a cell medium rate.

15. An asynchronous transfer mode switching unit including an asynchronous transfer mode switch fabric (72) and an asynchronous transfer mode switch adapter (43) according to any of the claims 7–14.

16. The asynchronous transfer mode switching unit of claim 15, comprising
   a virtual path identifier/virtual channel identifier insertion unit (73),
   a cell accounting unit (74),
   a traffic shaping unit (77) for delaying cells until they conform with given traffic permissions again, and
   a line interface handler (80) being located at the output port(s) of said switch fabric (72).

* * * * *